March 26, 1929.  G. F. SCHWARTZ  1,706,416
WATER TANK AND RADIANT FIRE ARRANGEMENT
Filed Nov. 11, 1922
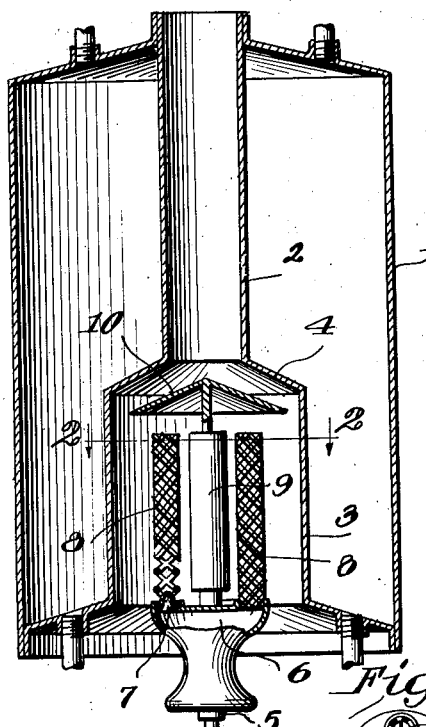
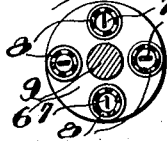
Inventor
G. F. Schwartz
By C. P. Goepel
Attorney Patented Mar. 26, 1929.

1,706,416

UNITED STATES PATENT OFFICE.

GERHARDT F. SCHWARTZ, OF ST. LOUIS, MISSOURI.

WATER TANK AND RADIANT FIRE ARRANGEMENT.

Application filed November 11, 1922. Serial No. 600,482.

The present invention relates to improvements in water heaters in which a higher and more instantaneous heating of the water is secured by combining with the boiler or water tank a burner or heater giving off radiant heat instead of contact or convected heat and so placed relatively to the structure and walls of the tank or boiler as to secure a maximum of heat with an economy of fuel.

The objects of the invention are to take advantage of the enormous heat developed by radiant refractories, glowers or candles; to utilize in connection with these radiant elements a backing or reflector placed on the opposite sides of the elements from the boiler or water tank wall receiving the heat whereby to utilize all of the heat units, the tank and burner being so situated and relatively arranged as to avoid the dissipation of heat; to secure these results in a compact arrangement and assembly of the burner, radiant heat devices and the water tank, and to produce the resultant combined structure at a small cost.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical section through a water heater constructed according to the present invention.

Figure 2 shows a section on the line 2—2 in Figure 1.

Referring more particularly to the drawings and for the present to Figures 1 and 2, 1 designates a water tank or boiler having an appropriate water supply source and a central flue 2 narrow at its upper portion as compared with the wider basal portion 3, there being a head 4 connecting the two portions of the flue. A burner designated generally at 5 is situated in the lower portion of the central space within the lower wide flue portion 3. The burner is connected with a source of fuel supply, for instance gas and the gas is led to a chamber 6 where it is admixed with air in appropriate quantities to form suitable fuel for burning at the tips or nozzles 7. In the instance shown the burner comprises a number of these tips situated concentrically and within mesh or filigree refractories, glowers or candles 8 which become incandescent by the heat of the flame from the tips 7 and throw off a high radiant heat. These refractories extend upwardly for a considerable distance and for the major portion of the height of the lower part of the flue, they being situated relatively close to the tank cylindrical wall 3, allowing only a suitable space between the two for the circulation of air in properly carrying the draft.

The wall 3 consequently receives a very high and intense heat from the refractories 8 and this is enhanced by a solid refractory 9 placed centrally of the burner and forming a center about which all of the mesh or filigree refractories 8 radiate. The central solid refractory 9 is appropriately supported by the central part of the burner 5 and rises to substantially the same height as the candles 8, possessing a suitable diameter in order that it may afford an adequate reflecting surface for all of the glowers. Of course the refractory 9 not only acts in the capacity of a reflector but by virtue of the material of which it is composed it acquires and absorbs heat itself which causes it to glow and become incandescent and therefore to give off heat independently of the ancillary glowers 8. By this arrangement the compact circular structure gives off in all directions to the cylindrical wall 3 of the water tank an intense heat which is conveyed to the water and readily and thoroughly heats the entire mass in the tank 1. The central solid refractory 9 serves the further function of supporting a hood or canopy 10 of a conical form spreading out beyond the sides of the glowers 8 and situated above the glowers and spaced beneath the head 4. The hood 10 is in such a position and is so constructed that the water products of the gas combustion depositing on the flue wall 2 will be encountered and deflected by this canopy to avoid dripping on the refractories and the canopy will divert these drippings to the space between the refractories 8 and the wall 3 so that these drippings may be gotten rid of readily and quickly and without clogging any of the parts or interfering with the action or progress of the heat in any way. Of course it is not essential that a gas burner be used to heat the refractories as electric resistance coils will act as well.

Now it will be appreciated from the foregoing that I have provided a compact assembly and arrangement of water tank, burner and radiant heat devices in which an intense and high heat will be secured at relatively small fuel cost and in which the apparatus is accessible for the removal and replacement of parts. The refractories will be quickly raised to a state of incandescence by the application of only small flame at the burner and long after the burner is extinguished, the radiant heat will persist and the water in the tank will thus be kept warm over a much greater length of time as compared with contact and convection heat. The apparatus will be found simple, the elements thereof easily and cheaply replaced when burnt out and the refractories are protected and made useful over a long period of time.

It is obvious that various changes and modifications may be made in the details of construction and design of the above specifically described embodiment of this invention without departing from the spirit therof, such changes and modifications being restricted only by the scope of the following claims:

What is claimed is:

1. A water heater comprising a water tank having a cylindrical wall, a circular series of open refractories placed within said cylindrical wall and spaced slightly therefrom, burners in connection with the open refractories, a solid refractory centrally of the series of open refractories adapted to radiate heat from the latter against the cylindrical wall and adapted to itself acquire, absorb and radiate heat, and a canopy carried by said solid refractory and extending above the group of refractories.

2. A water heater comprising a water tank being of substantially annular construction with a central flue, the lower portion of the flue being larger than the upper portion and there being a shoulder between the two portions, a burner having a number of circularly arranged nozzles at the lower portion of the flue, a circular series of open refractories extending within the lower portion of the flue and above the nozzles, said open refractories being spaced apart circularly and spaced from the adjacent wall of the flue, a central solid refractory within the circular group of open refractories adapted to reflect in radial directions the heat from the open refractories and to itself absorb and give off heat, and a conical canopy carried by the central solid refractory and extending above the group of refractories and beneath and spaced from the shoulder in said flue said canopy being of greater diameter than the diameter of the upper portion of the flue.

In testimony that I claim the foregoing as my invention, I have signed my name hereunder.

GERHARDT F. SCHWARTZ.